US012002237B2

(12) United States Patent
Ohira et al.

(10) Patent No.: US 12,002,237 B2
(45) Date of Patent: Jun. 4, 2024

(54) POSITION COORDINATE DERIVATION DEVICE, POSITION COORDINATE DERIVATION METHOD, POSITION COORDINATE DERIVATION PROGRAM, AND SYSTEM

(71) Applicant: NIPPON TELEGRAPH AND TELEPHONE CORPORATION, Tokyo (JP)

(72) Inventors: Toshiya Ohira, Musashino (JP); Yukihiro Goto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 387 days.

(21) Appl. No.: 17/431,200

(22) PCT Filed: Feb. 4, 2020

(86) PCT No.: PCT/JP2020/004035
§ 371 (c)(1),
(2) Date: Aug. 16, 2021

(87) PCT Pub. No.: WO2020/166424
PCT Pub. Date: Aug. 20, 2020

(65) Prior Publication Data
US 2022/0148216 A1 May 12, 2022

(30) Foreign Application Priority Data
Feb. 15, 2019 (JP) .................................. 2019-025258

(51) Int. Cl.
*G06T 7/73* (2017.01)
*G06T 7/55* (2017.01)

(52) U.S. Cl.
CPC . *G06T 7/73* (2017.01); *G06T 7/55* (2017.01)

(58) Field of Classification Search
CPC ......... G06T 7/70–77; G06T 7/50; G06T 7/55; G06T 7/579; G06T 7/593; G06T 7/596;
(Continued)

(56) References Cited

U.S. PATENT DOCUMENTS

2018/0045519 A1* 2/2018 Ghadiok ............. G06F 16/2379
2018/0211410 A1* 7/2018 Taylor .................... G06V 10/44
(Continued)

FOREIGN PATENT DOCUMENTS

| JP | H0735546 A | 2/1995 |
|---|---|---|
| JP | 201578849 A | 4/2015 |
| JP | 2017156179 A | 9/2017 |

OTHER PUBLICATIONS

Welzel, André, Andreas Auerswald, and Gerd Wanielik. "Accurate camera-based traffic sign localization." 17th International IEEE Conference on Intelligent Transportation Systems (ITSC). IEEE, 2014. (Year: 2014).*

(Continued)

*Primary Examiner* — Geoffrey E Summers
(74) *Attorney, Agent, or Firm* — Harness, Dickey & Pierce, P.L.C.

(57) ABSTRACT

An object of the present disclosure is to make it possible to ascertain coordinates of facility. A processor obtains two or more captured images of a facility and an object (S101), obtains position coordinates and an actual size of the facility and a size of the object from a database (S104), calculates a distance from each camera that has captured the two or more images to the object using a relationship between a distance from each camera that has captured the two or more images to the facility and a magnification with respect to the actual size of the facility on the two or more images (S108), and derives position coordinates of the object using the calculated distance (S109).

8 Claims, 8 Drawing Sheets

(58) Field of Classification Search
CPC ........... G06T 2207/30248–30264; G06T 7/60; G01C 3/06; G01C 15/00; G01B 11/00
See application file for complete search history.

(56) References Cited

U.S. PATENT DOCUMENTS

2019/0339074 A1* 11/2019 Liu .......................... G06T 7/74
2020/0043191 A1* 2/2020 Schoen .................. G01S 15/42

OTHER PUBLICATIONS

Tinnachote, Chanin, and Karuna Pimprasan. "Distance measurement from digital photograph using 3rd order polynomial equation." Proc. ACRS. 2012. (Year: 2012).*

Blaga, Bianca-Cerasela-Zelia and Sergiu Nedevschi. "A method for automatic pole detection from urban video scenes using stereo vision." 2018 IEEE 14th International Conference on Intelligent Computer Communication and Processing (ICCP). IEEE, 2018. (Year: 2018).*

Zhang, Weixing, et al. "Using deep learning to identify utility poles with crossarms and estimate their locations from google street view images." Sensors 18.8 (2018): 2484. (Year: 2018).*

Takeshi Shima et al., "Image Recognition for On-Board Cameras and Distance Measurement Using Stereo Camera" Optical Society of Applied Physics Subcommittee, Optical Society of Japan, vol. 41, No. 5, 2012, pp. 287-291, https://annex.jsap.or.jp/photonics/kogaku/public/41-05-kaisetsu5.pdf.

* cited by examiner

POSITION COORDINATE DERIVATION DEVICE, POSITION COORDINATE DERIVATION METHOD, POSITION COORDINATE DERIVATION PROGRAM, AND SYSTEM

CROSS-REFERENCE TO RELATED APPLICATIONS

This application is a 371 U.S. National Phase of International Application No. PCT/JP2020/004035 filed on Feb. 4, 2020, which claims priority to Japanese Application No. 2019-025258 filed on Feb. 15, 2019. The entire disclosures of the above applications are incorporated herein by reference.

TECHNICAL FIELD

The present disclosure relates to a position coordinate derivation method for deriving position coordinates of an object captured by a camera, and a position coordinate derivation device that executes the position coordinate derivation method.

BACKGROUND ART

As a planimetric surveying method, a photographic surveying method is known. As a typical technique, a stereo camera is known (e.g., see Patent Literature 1 and Non-Patent Literature 1). A stereo camera uses two cameras, and these two cameras are arranged at a known distance to simultaneously capture an image of a feature. The position of the feature in the image captured by each camera varies depending on the position of each camera. A distance from a feature can be measured by utilizing the fact that the variation in the position of the feature varies depending on the position of each camera. In addition, if a magnification of a photograph with respect to a distance is known, the size of a feature can be measured from a distance. This can also be achieved using two successive photographs captured using a single camera after moving horizontally by a certain distance.

A structural degradation determination system for obtaining 3D point group data using a 3D laser scanner-mounted vehicle (MMS) used for surveying or the like, automatically detecting a facility using the obtained 3D point group data, creating a 3D model for the detected facility, and measuring a structure state, such as an inclination or deformation of a pole, with high accuracy is used (e.g., see Patent Literature 2 and 3). The structural degradation determination system can display the coordinates of the pole and the size (height) of the pole with high accuracy. In addition, when the accurate position coordinates of the pole are obtained, a government classification for the pole can be ascertained and it is expected to promote the efficiency in occupied operation.

However, if it is difficult to create a 3D model for a facility, the accurate position coordinates of the facility cannot be obtained. For example, depending on the degree of fluctuation in the MMS body, a loss of point group data may occur due to a loss of a point group, which may make it difficult to create the 3D model for the facility. Further, in the existing structural degradation determination system, it is difficult to estimate position information using point group data. Accordingly, to increase target facilities in the future, a method using no point group data needs to be studied.

Accordingly, a method for ascertaining coordinates of a facility by measuring a distance from a camera to a target facility based not only on a point group, but also on images as information that can be obtained during travelling of the MMS needs to be studied. Currently, a stereo camera can be used as a method for ascertaining a position from a camera to a body. However, a stereo camera has the following issues. That is, (1) when two cameras are used, there is a need to capture an object using the two cameras. When a single camera is used, (2) there is a need to use successive photographs captured by moving horizontally by a certain distance. (3) When the size of a feature is measured from a distance, there is an issue that a magnification with respect to a distance between the camera and the feature needs to be ascertained in advance.

CITATION LIST

Patent Literature

Patent Literature 1: Japanese Patent Laid-Open No. H07-35546
Patent Literature 2: Japanese Patent Laid-Open No. 2015-078849
Patent Literature 3: Japanese Patent Laid-Open No. 2017-156179

Non-Patent Literature

Non-Patent Literature 1: Image Recognition for On-Board Cameras and Distance Measurement Using Stereo Camera: https://annex.jsap.or.jp/photonics/kogaku/public/41-05-kaisetsu5.pdf

SUMMARY OF THE INVENTION

Technical Problem

An object of the present disclosure is to make it possible to ascertain coordinates of a facility without using two cameras and successive photographs captured by moving horizontally by a certain distance, even if a magnification with respect to a distance between a camera and a feature is unknown.

Means for Solving the Problem

To attain the above-described object, the present disclosure obtains position coordinates and a size of a facility, such as a pole, from model information about a structural degradation determination system, calculates a distance from position coordinates of a camera to an object using two or more images, and calculates coordinates of the object from the distance and the position coordinates of the camera, thereby obtaining the coordinates of the object.

DETAILED DESCRIPTION OF THE INVENTION

Specifically, in a position coordinate derivation device according to the present disclosure, a processor obtains two or more captured images of a facility and an object; the processor obtains position coordinates and an actual size of the facility and a size of the object from a database; the processor calculates a distance from each camera that has captured the two or more images to the object using a relationship between a distance from each camera that has captured the two or more images to the facility and a magnification with respect to the actual size of the facility on the two or more images; and the processor derives position coordinates of the object using the calculated distance.

The position coordinate derivation device according to the present disclosure includes a mode in which: the two or more images include a first image and a second image; the processor measures a size of the facility on the first image and a size of the facility on the second image; the processor obtains a relationship between a size of a body on the first image and a distance from a first camera that has captured the first image using a first distance from the first camera to the facility, the actual size of the facility, and the size of the facility on the first image; the processor obtains a relationship between a size of a body on the second image and a distance from a second camera that has captured the second image using a second distance from the second camera to the facility, the actual size of the facility, and the size of the facility on the second image; and the processor calculates a third distance from the first camera corresponding to a size of the object on the first image to the object and a fourth distance from the second camera corresponding to a size of the object on the second image to the object using a relationship between the size of the body on the first image and a distance from the first camera and a relationship between the size of the body on the second image and a distance from the second camera.

The position coordinate derivation device according to the present disclosure includes a mode in which: the first camera and the second camera have the same focal distance; the processor obtains a first curve that passes through a first point, a second point, and a third point, the first point being determined depending on the first distance and the size of the facility on the first image, the second point being determined depending on the second distance and the size of the facility on the second image, the third point being determined depending on the double of the focal distance and the actual size of the facility; and the processor obtains the third distance and the fourth distance using the first curve.

The position coordinate derivation device according to the present disclosure includes a mode in which: a second curve is obtained by moving the first curve to pass through a fourth point determined depending on the double of the focal distance and the size of the object; a distance on the second curve determined depending on the size of the object on the first image is obtained as the third distance; and a distance on the second curve determined depending on the size of the object on the second image is obtained as the fourth distance.

The position coordinate derivation device according to the present disclosure includes a mode in which: the processor derives, as position coordinates of the object, position coordinates of one point selected from two points at which the third distance on which position coordinates of the first camera are centered and the fourth distance on which position coordinates of the second camera are centered intersect with each other, the one point conforming to an arrangement of the facility and the object on the first image and the second image.

A system according to the present disclosure is a system that detects a state of facilities to be managed using three-dimensional point group data representing three-dimensional coordinates of a point on a surface of an outdoor structure obtained by a 3D mapping system, the system including: a position coordinate derivation device according to the present disclosure; and the database that stores a size and position coordinates of the facility. In a case where a facility whose position coordinates are unknown is included in the facilities to be managed, the position coordinate derivation device derives position coordinates of the facility as the object.

The position coordinate derivation device may store, in the database, the derived position coordinates of the object as position coordinates of the facility whose position coordinates are unknown.

A position coordinate derivation method according to the present disclosure includes: obtaining, by a processor, two or more captured images of a facility and an object; obtaining, by the processor, position coordinates and an actual size of the facility and a size of the object from a database; calculating, by the processor, a distance from each camera that has captured the two or more images to the object using a relationship between a distance from each camera that has captured the two or more images to the facility and a magnification with respect to the actual size of the facility on the two or more images; and deriving, by the processor, position coordinates of the object using the calculated distance.

A position coordinate derivation program according to the present disclosure causes a computer to execute functions included in the position coordinate derivation device according to the present disclosure. Further, the position coordinate derivation program according to the present disclosure causes the computer to execute procedures included in the position coordinate derivation method to be executed by the position coordinate derivation device according to the present disclosure. The position coordinate derivation program according to the present disclosure can be recorded on a recording medium, or can be provided via a network.

Note that the above-described disclosures can be combined as much as possible.

Effects of the Invention

According to the present disclosure, it is possible to ascertain coordinates of a facility without using two cameras and successive photographs captured by moving horizontally by a certain distance, even if a magnification with respect to a distance between a camera and a feature is unknown.

DESCRIPTION OF EMBODIMENTS

Figure 1:
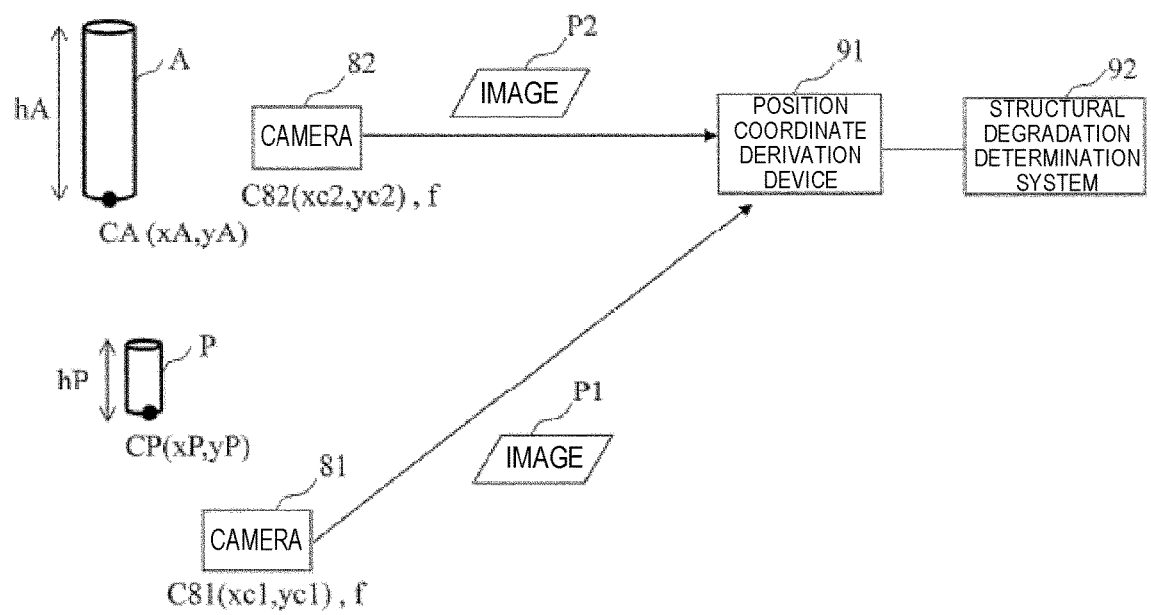
FIG. 1 illustrates an example of a system configuration according to the present embodiment.

Embodiments of the present disclosure will be described in detail below with reference to the drawings. Note that the present disclosure is not limited to the embodiments described below. These embodiments are illustrated by way of example only, and the present disclosure can be carried out by changing or modifying the present disclosure in various ways based on knowledge of a person skilled in the art. Note that the same components are denoted by the same reference numerals in the specification and the drawings.

FIG. 1 illustrates an example of a system configuration according to the present embodiment. A system according to the present embodiment includes a plurality of cameras 81 and 82, a structural degradation determination system 92, and a position coordinate derivation device 91. The cameras 81 and 82 capture images of a pole A and an object P.

The camera 81 functions as a first camera and captures an image P1 as a first image. The camera 82 functions as a second camera and captures an image P2 as a second image. The images P1 and P2 are images captured by any camera with a focal distance f set to the same value. As the cameras 81 and 82, for example, cameras capable of obtaining 3D point group data to be used for the structural degradation determination system 92 can be used. Alternatively, the cameras 81 and 82 may be cameras captured by any camera installed in the road. The images P1 and P2 are not limited to still images, but instead may be moving images.

While the present embodiment illustrates an example where the two cameras 81 and 82 are used, one or more cameras can be used in the present disclosure. For example, when the camera 81 that is present at position coordinates C81 (xc1, yc1) at time t1 moves to position coordinates C82 (xc2, yc2), the camera 81 may be used as the camera 82. Thus, the cameras 81 and 82 may be different cameras, or may be the same camera. Further, the system according to the present disclosure may use three or more cameras.

Figure 2:
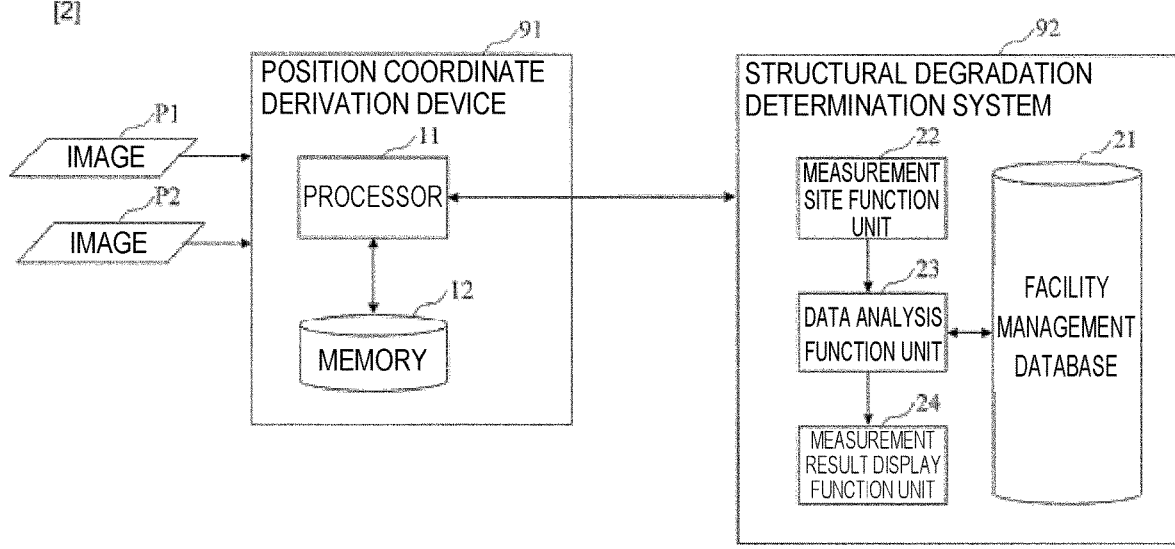
FIG. 2 illustrates a configuration example of each of a position coordinate derivation device and a structural degradation determination system.

FIG. 2 illustrates a configuration example of each of the position coordinate derivation device 91 and the structural degradation determination system 92. The position coordinate derivation device 91 according to the present embodiment includes a processor 11 and a memory 12. The memory 12 stores a position coordinate derivation program. The processor 11 executes the position coordinate derivation program, thereby making it possible to configure the position coordinate derivation device 91. The structural degradation determination system 92 includes a facility management database 21, a measurement site function unit 22, a data analysis function unit 23, and a measurement result display function unit 24. The measurement site function unit 22 corrects the position of the above-described point group data. The data analysis function unit 23 analyzes the point group data and quantitatively determines structural degradation. The measurement result display function unit 24 assists narrowing a material deterioration diagnosis in on-site diagnosis.

The position coordinate derivation device 91 according to the present embodiment obtains the images P1 and P2. The position coordinate derivation device 91 according to the present embodiment is connected to the structural degradation determination system 92, and obtains an actual height hA and position coordinates CA (xA, yA) of the pole A and an actual height hP of the object P from the structural degradation determination system 92. The processor 11 of the position coordinate derivation device 91 derives position coordinates CP (xP, yP) of the object P using the images P1 and P2 and these pieces of information obtained from the structural degradation determination system 92.

The measurement site function unit 22 loads facility information from the facility management database 21, extracts models, performs automatic matching and correction, and stores the models in the facility management database 21. An example of a diagnosis assist function for the measurement result display function unit 24 will be described below. The measurement result display function unit 24 performs, for example, display of a diagnosis menu, display of a progress, superimposition with a photographic model, and display of an omnidirectional camera image. The measurement result display function unit 24 displays information about a position or a space using a geographic information system (GIS). The measurement result display function unit 24 displays a list of diagnosis results, and visualizes manual extraction of models to be displayed to an operator of a diagnosis site terminal.

If a facility whose position coordinates are unknown is included in facilities to be managed by the structural degradation determination system 92, the position coordinate derivation device 91 derives position coordinates of the facility as the object and stores the position coordinates in the facility management database 21. Note that the storage destination of the position coordinates derived by the position coordinate derivation device 91 is not limited to the structural degradation determination system 92.

The present disclosure includes the following features.
Distances between position coordinates of the cameras 81 and 82 and position coordinates of the pole A are calculated.
The position coordinates of the pole A and the actual size of the pole A are obtained from model information about the structural degradation determination system 92. In this case, the size includes a height and a width.
A relationship (magnification/focal distance) between the distances and the size on the images P1 and P2 is used.
Distances from position coordinates of the cameras 81 and 82 to the object P are calculated using two or more images P1 and P2, and derives the coordinates of the object P from the distances and the position coordinates of the cameras 81 and 82.

In particular, in the present disclosure, the position coordinates CA (xA, yA) of the pole A and the actual height hA are required for measurement, but it is one of the features to obtain these pieces of information from the structural degradation determination system 92.

(Measurement Method)

Figure 3:
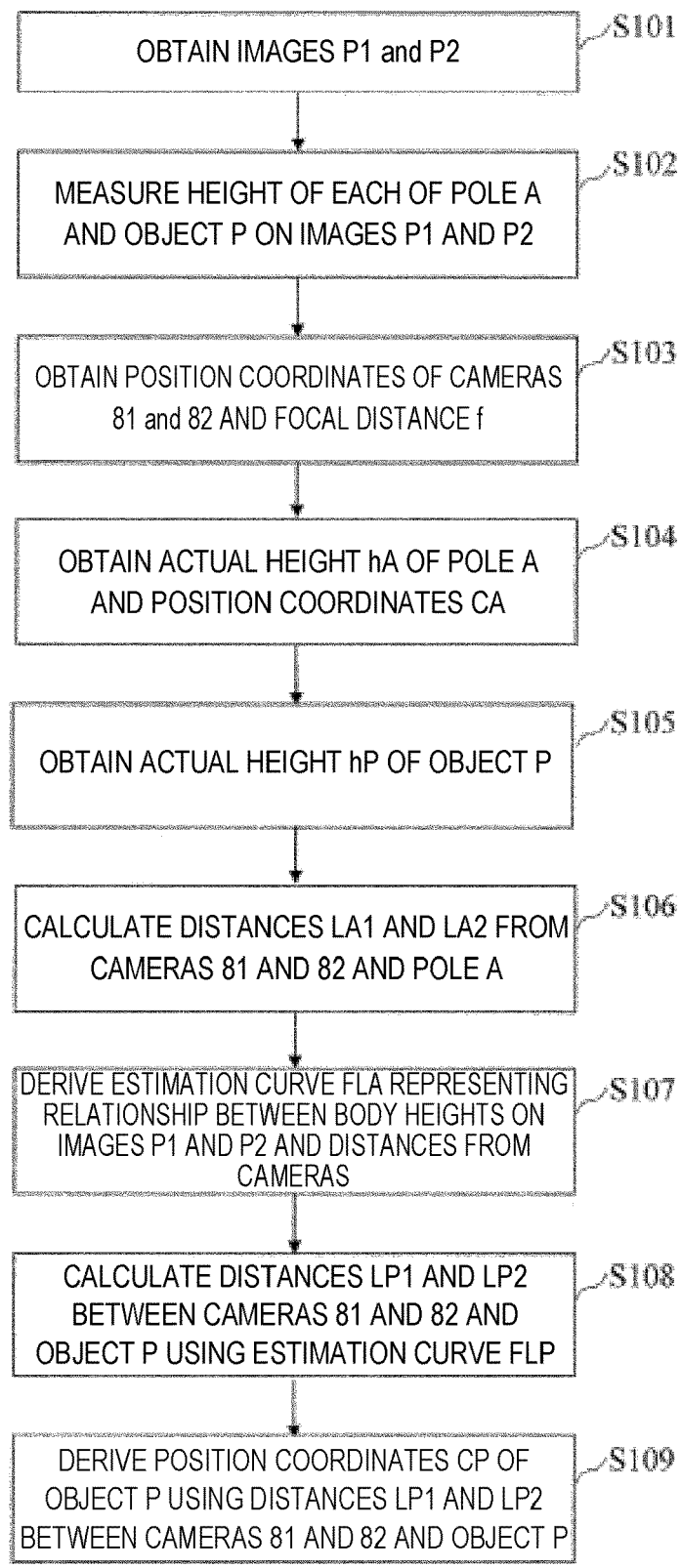
FIG. 3 illustrates an example of a position coordinate derivation method according to the present embodiment.

FIG. 3 illustrates an example of a position coordinate derivation method according to the present embodiment. In the position coordinate derivation method according to the present embodiment, the processor 11 of the position coordinate derivation device 91 executes the following procedures S101 to S109. The present embodiment is described using only two-dimensional coordinates of x and y, for ease of explanation. Note that in the case of calculating position coordinates of the object P using three-dimensional coordinates of x, y, and z, three images may be used.

Figure 4:
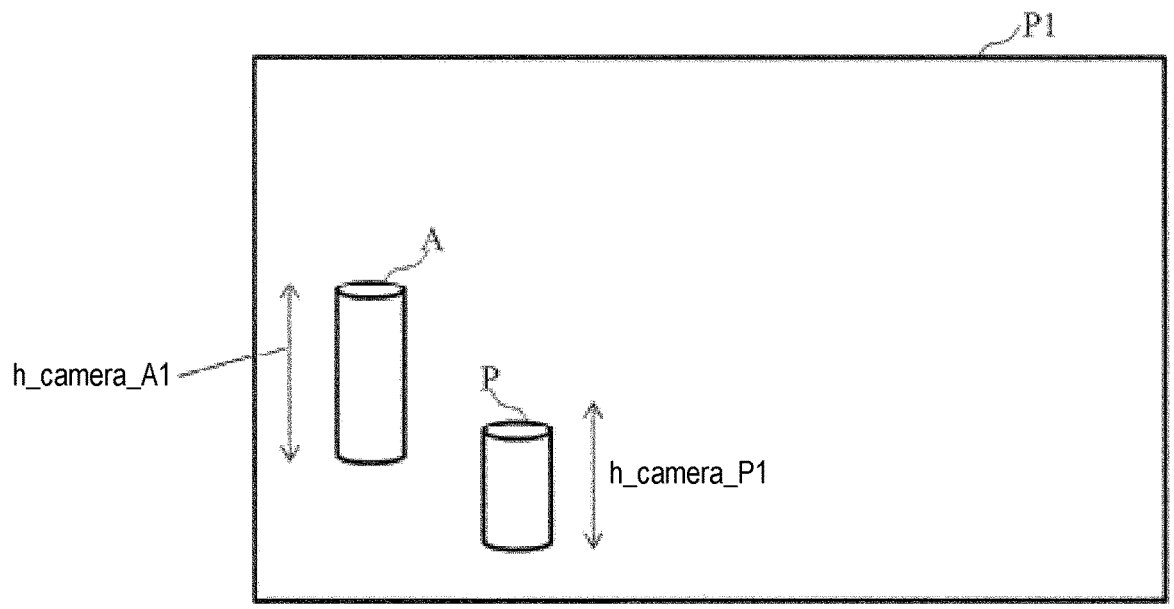
FIG. 4 illustrates an example of a first image.
Figure 5:
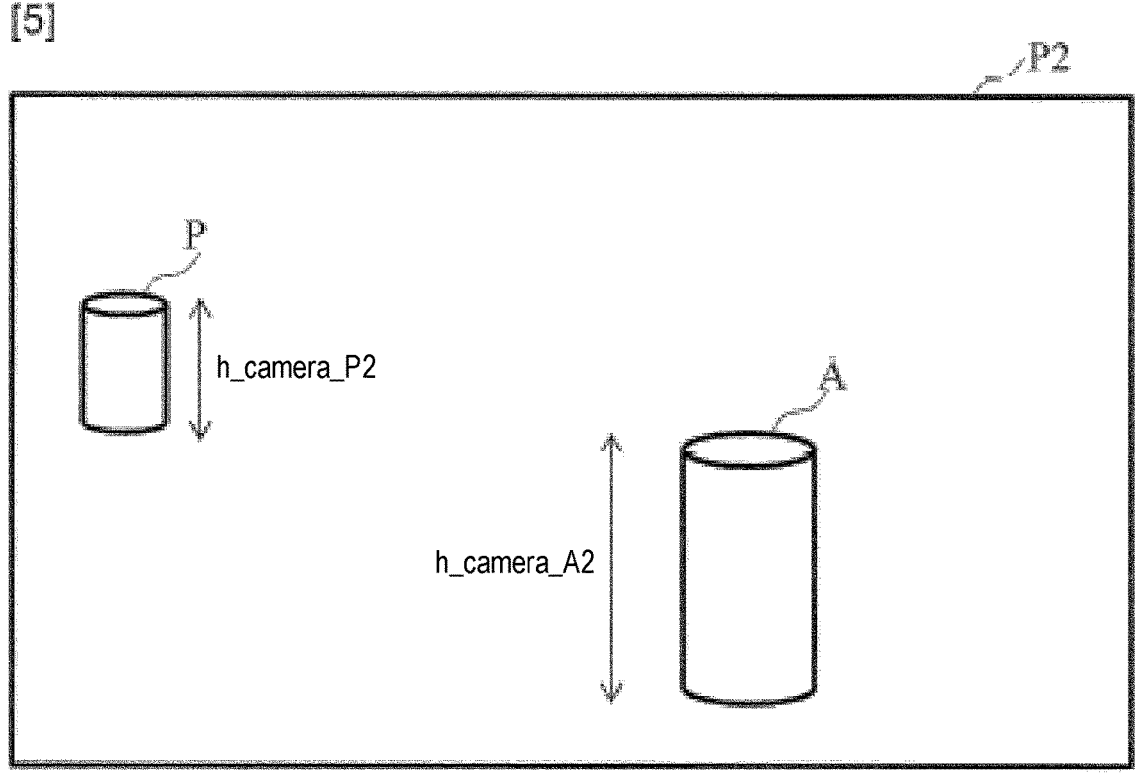
FIG. 5 illustrates an example of a second image.

Procedure S101: The processor 11 obtains the images P1 and P2 of the object P and one pole (pole A) which are captured from different viewpoints. FIG. 4 illustrates an example of the image P1, and FIG. 5 illustrates an example of the image P2. The pole A and the object P are captured in both of the images.

Procedure S102: The processor 11 measures a height h_camera_A1 of the pole A on the image P1 and a height h_camera_P1 of the object P on the image P1. Further, the processor 11 measures a height h_camera_A2 of the pole A and a height h_camera_P2 of the object P on the image P2.

Procedure S103: The processor 11 obtains the position coordinates C81 (xc1, yc1) and the focal distance f of the camera 81 that has captured the image P1. Further, the processor 11 obtains the position coordinates C82 (xc2, yc2) and the focal distance f of the camera 82 that has captured the image P2. For example, the position coordinate and the focal distance of the camera 81 are obtained from attribute information about the image P1, and the position coordinates and the focal distance of the camera 82 are obtained from attribute information about the image P2.

Procedure S104: The processor 11 obtains an actual height hA and position coordinates CA (xA, yA) of the pole A from the facility management database 21. In this case, the facility management database 21 is a database in which the position coordinates and actual height of each pole are stored in advance, and is included in the structural degradation determination system 92.

Figure 6:
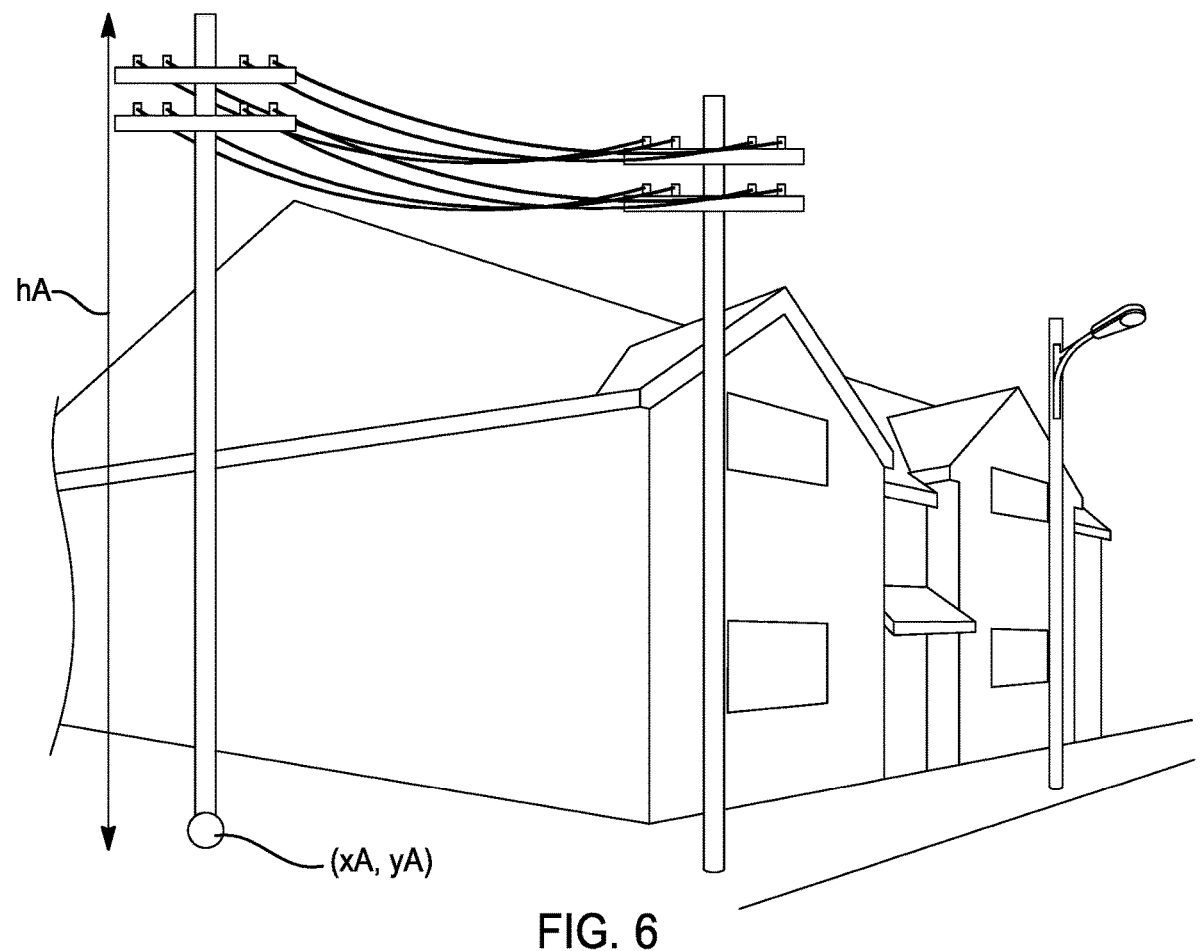
FIG. 6 illustrates an example of a 3D pole model obtained by a structural degradation determination system.

FIG. 6 illustrates an example of a 3D pole model obtained by the structural degradation determination system 92. By referring to the structural degradation determination system 92, the position coordinate derivation device 91 can obtain information about a structure managed by the structural degradation determination system 92. For example, in the structural degradation determination system 92, the 3D point group image in which the pole indicated by identification information "Pole_124" is captured and the position coordinates and actual height of the pole indicated by the identification information "Pole_124" are managed in the facility management database 21.

Procedure S105: The processor 11 obtains the actual height hP of the object P from the facility management database 21. For example, the processor 11 identifies the type of the object P by image analysis, and obtains the actual height hP of the object P from the facility management database 21 using the type of the object P as an argument. In this case, the database that stores the actual height hP is not limited to the facility management database 21, but instead any database connected via a communication network can be used.

Figure 7:
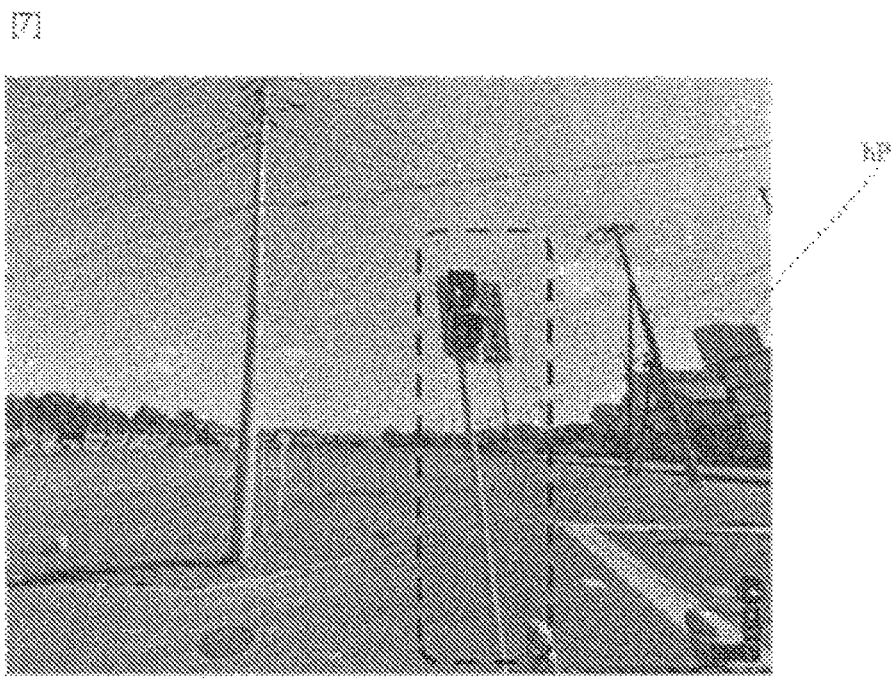
FIG. 7 illustrates an example of an image analysis.

FIG. 7 illustrates an example of the image analysis. A traffic light is captured in FIG. 7. The processor 11 determines the type of the traffic light, and obtains the actual height hP depending on the type of the traffic light from the facility management database 21.

Procedure S106: Distances LA1 and LA2 between the cameras 81 and 82 and the pole A are calculated using the position coordinates of the pole A and the position coordinates of each of the cameras 81 and 82. The distance LA1 indicates a first distance according to the present disclosure, and the distance LA2 indicates a second distance according to the present disclosure.

Figure 8:
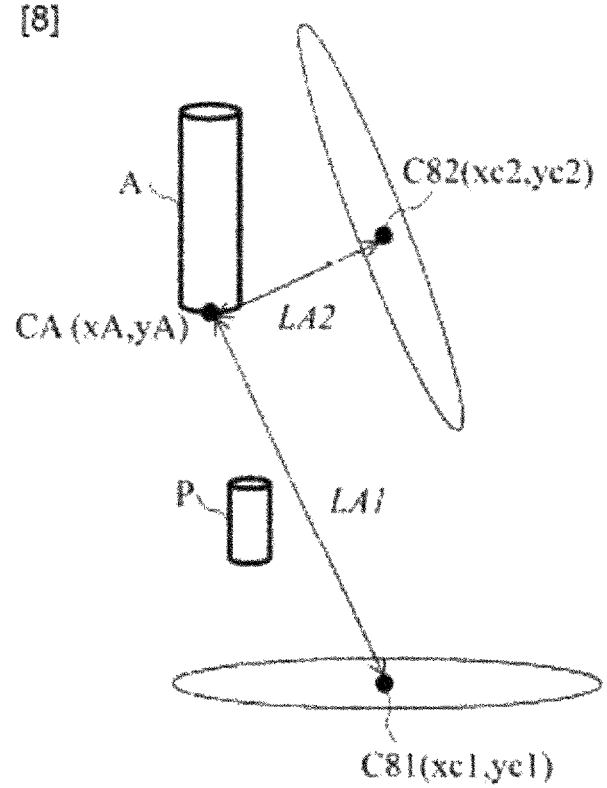
FIG. 8 illustrates an example of a distance between first and second cameras and a pole.

For example, as illustrated in FIG. 8, when the position coordinates of the camera 81 that has captured the image P1 are represented by C81 (xc1, yc1) and the position coordinates of the camera 82 that has captured the image P2 are represented by C82 (xc2, yc2), the distances LA1 and LA2 from the position coordinates CA (xA, yA) of the pole A and the position coordinates C81 (xc1, yc1) and C82 (xc2, yc2) of the cameras 81 and 82 to the pole A can be obtained by the following expressions.

[Math. 1]
$$LA1=\sqrt{(xc1-xA)^2+(yc1-yA)^2} \quad (1)$$

[Math. 2]
$$LA2=\sqrt{(xc2-xA)^2+(yc2-yA)^2} \quad (2)$$

Procedure S107: A graph illustrated in FIG. 9 is created using the actual height hA of the pole A, the height h_camera_A1 of the pole A on the image P1, the height h_camera_A2 of the pole A on the image P2, the focal distance f, LA1, and LA2, and a magnification with respect to each distance on the images P1 and P2 is calculated.

Figure 9:
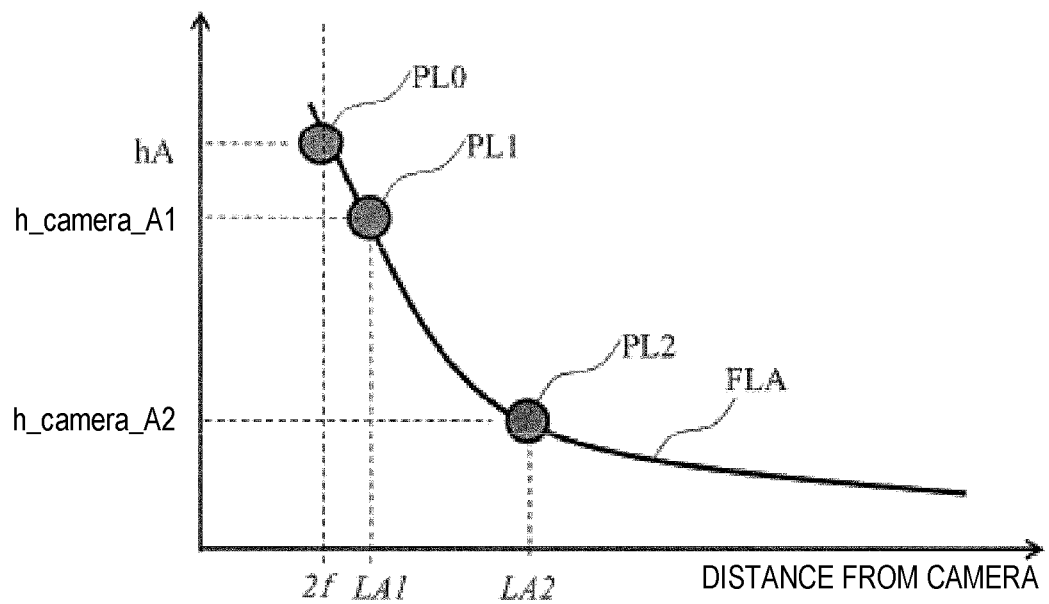
FIG. 9 illustrates an example of a graph for determining a magnification with respect to a distance.

In FIG. 9, a body height on each image with respect to the distance from each camera is plotted. PL1 represents a first point specified by the height h_camera_A1 with respect to the distance LA1, and PL2 represents a second point specified by the height h_camera_A2 with respect to the distance LA2. In the present disclosure, the focal distances of the cameras 81 and 82 are represented by "f". Accordingly, a magnification on each image with respect to a distance from each of the cameras 81 and 82 can be obtained using the point PL1 and the point PL2.

Further, according to the present disclosure, the cameras 81 and 82 have the same focal distance. Accordingly, a third point specified by the actual height hA with respect to a distance that is the double of the focal distance f is plotted as a point PL0. Thus, a curve FLA that passes through the three points can be obtained. The curve FLA indicates a first curve according to the present disclosure.

Figure 10:
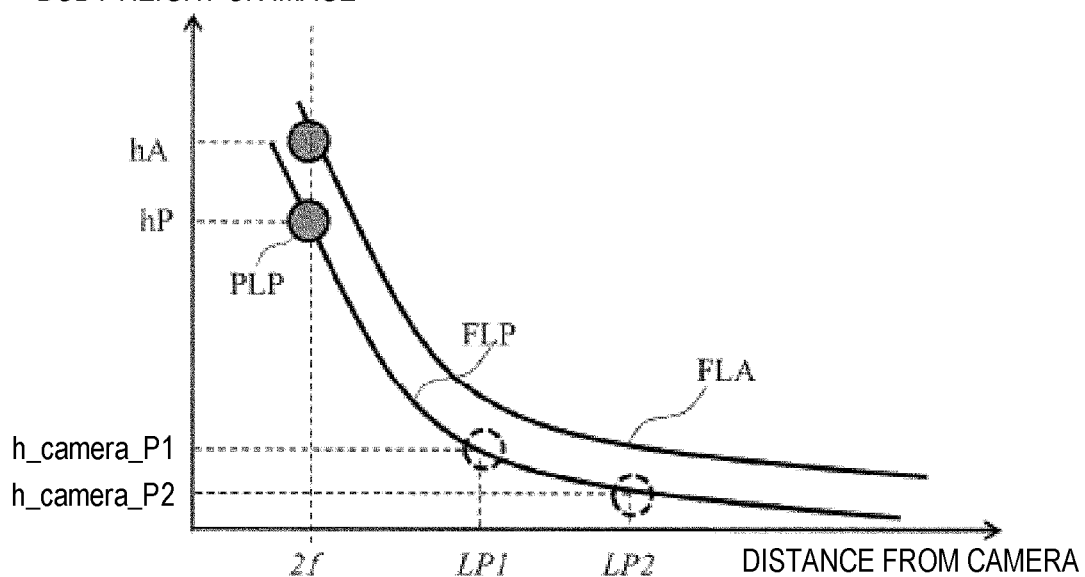
FIG. 10 illustrates an example of deriving a distance between the first and second cameras and an object using an estimation curve.

Procedure S108: On the graph illustrated in FIG. 9, a point PLP specified by a distance that is the double of the focal distance f and the actual height hP of the object P is plotted as a fourth point. A curve is obtained by moving the curve FLA in parallel such that the curve passes through the point PLP. Thus, an estimation curve FLP representing a relationship between a body height on each image and the distance from each camera can be obtained for the object P as illustrated in FIG. 10. The estimation curve FLP represents a second curve according to the present disclosure.

Figure 11:
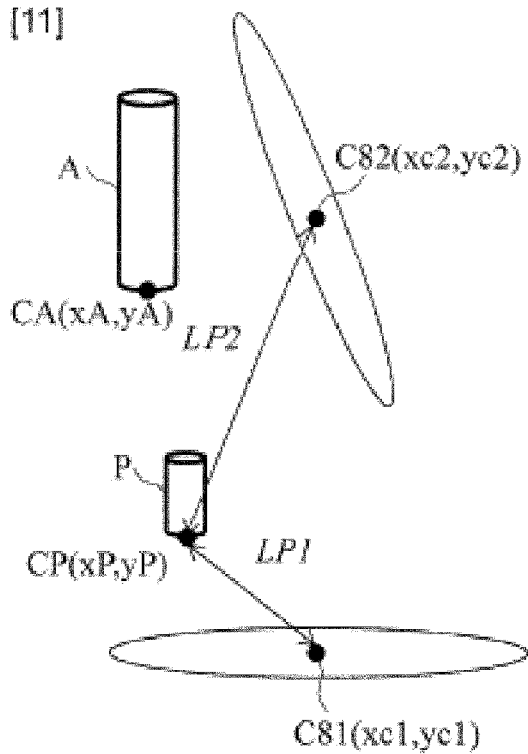
FIG. 11 illustrates an example of a distance between the first and second cameras and the object.

Then, distances LP1 and LP2 of the object P at the height h_camera_P2 of the object A on the image P2 corresponding to the height h_camera_P1 of the object P on the image P1 are calculated using the estimation curve FLP illustrated in FIG. 10. These distances LP1 and LP2 correspond to the distances LP1 and LP2 from the position coordinates CP (xP, yP) of the object P to the position coordinates C81 (xc1, yc1) and C82 (xc2, yc2) of the cameras 81 and 82, respectively, when the position coordinates of the camera 81 that has captured the image P1 are represented by C81 (xc1, yc1) and the position coordinates of the camera 82 that has captured the image P2 are represented by C82 (xc2, yc2) as illustrated in FIG. 11. The distance LP1 indicates a third distance according to the present disclosure, and the distance LP2 indicates a fourth distance according to the present disclosure.

[Math. 3]
$$(x-xc2)^2+(y-yc2)^2=LP2^2 \quad (3)$$

[Math. 4]
$$(x-xc1)^2+(y-yc1)^2=LP1^2 \quad (4)$$

Figure 12:
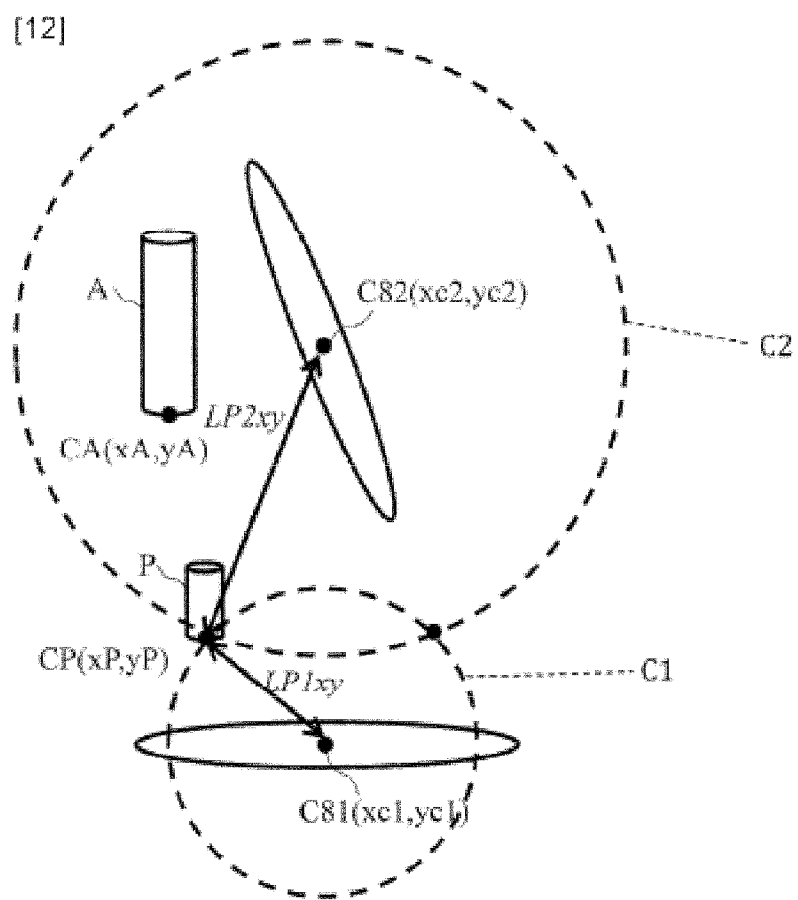
FIG. 12 illustrates an example of deriving position coordinates of an object using the distance between the first and second cameras and the object.

Procedure S109: Two circles C1 and C2 which have radii corresponding to the distances LP1 and LP2, respectively, as illustrated in FIG. 12 and which are centered on the position coordinates C81 (xc1, yc1) and the position coordinates C82 (xc2, yc2) of the cameras 81 and 82, respectively, are created, and the position coordinates CP (xP, yP) of the object P are calculated from intersections between the two circles C1 and C2. Note that up to two candidate points for the position coordinates are present, and one of the candidate points can be specified based on a positional relationship between the pole A and the object P on the images P1 and P2.

As described above, according to the present disclosure, the position coordinate derivation device 91 executes the procedures S101 to S109. Thus, according to the present disclosure, the distances LP1 and LP2 from the cameras 81 and 82 are obtained using estimation curves illustrated in FIGS. 9 and 10 (S108), and the position coordinates CP (xP, yP) of the object P are obtained using these distances LP1 and LP2 (S109). In the case of obtaining the estimation curve FLP, at least the two images P1 and P2 in which the pole A whose position coordinates and height can be obtained and the object P whose height can be obtained are captured may be used (S101 to S107). Note that the procedures S102 to S105 may be executed in any order, or may be simultaneously executed.

Thus, the present disclosure includes the following features.

There is no need to use two cameras.

There is no need to use two images that are captured at horizontal movement positions, but instead two images captured from any location may be used.

There is no need to preliminarily ascertain the magnification of each camera for image capturing.

Therefore, the present disclosure makes it possible to ascertain coordinates of any facility that can be captured as the object P.

In the present embodiment, the curve FLA that is determined depending on the body height on each image with respect to the distance from each camera is obtained and the distances LP1 and LP2 are obtained using the curve as the estimation curve. However, according to the present disclosure, the distances LP1 and LP2 can be obtained by any method that satisfies the contrast relationship between the magnification of the pole A and the distance LA1 on the image P1 and the magnification of the pole A and the distance LA2 on the image P2.

The present embodiment illustrates an example where the relationship between the distance and the magnification on each image is derived using the height of the pole A. However, the present disclosure is not limited to this example. For example, any size, such as a width, can be used instead of the height.

Further, in the procedure S107, the point LP0 that is specified by the distance that is the double of the focal distance f and the actual height hA is plotted so as to plot the third point. However, the present disclosure is not limited to this example. For example, a third image having the same focal distance f may be used.

While the present embodiment illustrates an example where the facility, the actual height of which is loaded from the facility management database 21, is a pole, the present disclosure can use any facility that can be loaded from the structural degradation determination system 92. Examples of such a facility include not only a street light and a pole, but also a cable closure.

INDUSTRIAL APPLICABILITY

The present disclosure is applicable to information and communication industries.

REFERENCE SIGNS LIST 11 processor
12 memory
21 facility management database
22 measurement site function unit
23 data analysis function unit
24 measurement result display function unit
81, 82 camera
91 position coordinate derivation device
92 structural degradation determination system

The invention claimed is:

1. A position coordinate derivation device comprising a processor, wherein:
the processor obtains two or more captured images of a facility and an object;
the processor obtains position coordinates and an actual size of the facility and a size of the object from a database;
the processor calculates a distance from each camera that has captured the two or more images to the object using a relationship between a distance from each camera that has captured the two or more images to the facility and a magnification with respect to the actual size of the facility on the two or more images; and
the processor derives position coordinates of the object using the calculated distance.

2. The position coordinate derivation device according to claim 1, wherein:
the two or more images include a first image and a second image;
the processor measures a size of the facility on the first image and a size of the facility on the second image;
the processor obtains a relationship between a size of a body on the first image and a distance from a first camera that has captured the first image using a first distance from the first camera to the facility, the actual size of the facility, and the size of the facility on the first image;
the processor obtains a relationship between a size of a body on the second image and a distance from a second camera that has captured the second image using a second distance from the second camera to the facility, the actual size of the facility, and the size of the facility on the second image; and
the processor calculates a third distance from the first camera corresponding to a size of the object on the first image to the object and a fourth distance from the second camera corresponding to a size of the object on the second image to the object using a relationship between the size of the body on the first image and a distance from the first camera and a relationship between the size of the body on the second image and a distance from the second camera.

3. The position coordinate derivation device according to claim 2, wherein:
the first camera and the second camera have the same focal distance;
the processor obtains a first curve that passes through a first point, a second point, and a third point, the first point being determined depending on the first distance and the size of the facility on the first image, the second point being determined depending on the second distance and the size of the facility on the second image, the third point being determined depending on the double of the focal distance and the actual size of the facility; and the processor obtains the third distance and the fourth distance using the first curve.

4. The position coordinate derivation device according to claim 3, wherein:
 a second curve is obtained by moving the first curve to pass through a fourth point determined depending on the double of the focal distance and the size of the object;
 a distance on the second curve determined depending on the size of the object on the first image is obtained as the third distance; and
 a distance on the second curve determined depending on the size of the object on the second image is obtained as the fourth distance.

5. The position coordinate derivation device according to claim 1, wherein the processor derives, as position coordinates of the object, position coordinates of one point that conforms to an arrangement of the facility and the object on the first image and the second image from two points at which the third distance on which position coordinates of the first camera are centered and the fourth distance on which position coordinates of the second camera are centered intersect with each other.

6. A system that detects a state of facilities to be managed using three-dimensional point group data representing three-dimensional coordinates of a point on a surface of an outdoor structure obtained by a 3D mapping system, the system comprising:
 a position coordinate derivation device according to claim 1; and
 the database that stores a size and position coordinates of the facility, wherein in a case where a facility whose position coordinates are unknown is included in the facilities to be managed, the position coordinate derivation device derives position coordinates of the facility as the object.

7. The system according to claim 6, wherein the position coordinate derivation device stores, in the database, the derived position coordinates of the object as position coordinates of the facility whose position coordinates are unknown.

8. A position coordinate derivation method comprising:
 obtaining, by a processor, two or more captured images of a facility and an object;
 obtaining, by the processor, position coordinates and an actual size of the facility and a size of the object from a database;
 calculating, by the processor, a distance from each camera that has captured the two or more images to the object using a relationship between a distance from each camera that has captured the two or more images to the facility and a magnification with respect to the actual size of the facility on the two or more images; and
 deriving, by the processor, position coordinates of the object using the calculated distance.

* * * * *